(12) United States Patent
Okawa

(10) Patent No.: US 12,467,956 B2
(45) Date of Patent: Nov. 11, 2025

(54) MAGNETIC SENSOR

(71) Applicant: TDK Corporation, Tokyo (JP)

(72) Inventor: Shuichi Okawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 173 days.

(21) Appl. No.: 18/264,304

(22) PCT Filed: Jan. 28, 2022

(86) PCT No.: PCT/JP2022/003326
§ 371 (c)(1),
(2) Date: Aug. 4, 2023

(87) PCT Pub. No.: WO2022/176570
PCT Pub. Date: Aug. 25, 2022

(65) Prior Publication Data
US 2024/0094262 A1    Mar. 21, 2024

(30) Foreign Application Priority Data

Feb. 17, 2021    (JP) ................................. 2021-023597

(51) Int. Cl.
*G01R 33/00*    (2006.01)
*G01R 15/18*    (2006.01)
*G01R 19/00*    (2006.01)

(52) U.S. Cl.
CPC ......... *G01R 15/18* (2013.01); *G01R 19/0092* (2013.01)

(58) Field of Classification Search
CPC .. G01R 15/18; G01R 15/207; G01R 19/0092; G01R 33/0011; G01R 33/0017
See application file for complete search history.

(56) References Cited

U.S. PATENT DOCUMENTS

2012/0313633 A1 * 12/2012 Schatz ............... G01R 33/0023
324/225
2014/0340183 A1    11/2014 Nakada et al.
(Continued)

FOREIGN PATENT DOCUMENTS

JP    06-130088 A    5/1994
JP    2008-128711 A    6/2008
(Continued)

OTHER PUBLICATIONS

International Search Report issued in corresponding International Patent Application No. PCT/JP2022/003326, dated Apr. 12, 2022, with English translation.
(Continued)

*Primary Examiner* — Dominic E Hawkins
(74) *Attorney, Agent, or Firm* — Rimon P.C.

(57) ABSTRACT

A magnetic sensor includes: a sensor chip having magnetic layers magnetically coupled to each other through a magnetic gap and a magnetic sensing element disposed on a magnetic path formed by the magnetic gap; an external magnetic member magnetically coupled to one of the magnetic layer 21; and a measuring current coil wound around the external magnetic member and through which a current for generating a magnetic field to be measured flows. The magnetic sensing element 31 and the magnetic layers are thus integrated in the sensor chip, so that the magnetic gap can be designed to be very small in width, and a leakage magnetic field can be applied in large amounts to the magnetic sensing element. Thus, even when the current I flowing in the measuring current coil is weak, a magnetic field generated by the current I can be detected with high sensitivity.

20 Claims, 11 Drawing Sheets

(56) References Cited

U.S. PATENT DOCUMENTS

| | | | | |
|---|---|---|---|---|
| 2016/0154020 A1* | 6/2016 | Zhang | ................ | G01C 19/5712 |
| | | | | 73/504.12 |
| 2020/0191885 A1* | 6/2020 | Lin | ...................... | G01R 33/093 |
| 2021/0116518 A1* | 4/2021 | Gokita | ................... | G01R 33/09 |
| 2022/0349960 A1* | 11/2022 | Akushichi | .......... | G01R 33/0011 |
| 2024/0142404 A1* | 5/2024 | Fukui | .................... | G01N 27/87 |

FOREIGN PATENT DOCUMENTS

| | | | | | |
|---|---|---|---|---|---|
| JP | 2013-134076 A | 7/2013 | | | |
| JP | 2016-144118 A | 8/2016 | | | |
| JP | 2020071198 A | * 11/2018 | ............. | G01R 33/09 |
| JP | 2018-197661 A | 12/2018 | | | |

OTHER PUBLICATIONS

Extended European Search Report issued in corresponding International Patent Application No. 22755893.9 dated Oct. 12, 2024.

\* cited by examiner

MAGNETIC SENSOR

CROSS REFERENCE TO RELATED APPLICATIONS

This application is the U.S. National Phase under 35 U.S.C. § 371 of International Application No. PCT/JP2022/003326, filed on Jan. 28, 2022, which claims the benefit of Japanese Patent Application No. 2021-023597, filed on Feb. 17, 2021, the entire contents of each are hereby incorporated by reference.

TECHNICAL FIELD

The present invention relates to a magnetic sensor and, more particularly, to a magnetic sensor that detects a magnetic field generated by a current for generating a weak magnetic field to be measured.

BACKGROUND ART

Patent Document 1 discloses a magnetic sensor (current sensor) that detects a magnetic field generated by a current for generating a magnetic field to be measured. The magnetic sensor described in Patent Document 1 includes an annular magnetic core having a magnetic gap, a coil wound around the annular core and through which a current for generating a magnetic field to be measured flows, and a magnetic sensing element disposed within the magnetic gap. With this configuration, a part of a leakage magnetic field passing through the magnetic gap is applied to the magnetic sensing element, thus allowing the amount of current flowing through the coil to be measured by the magnetic sensing element.

CITATION LIST

Patent Document

[Patent Document 1] JP 2008-128711A

DISCLOSURE OF THE INVENTION

Problem to be Solved by the Invention

However, the magnetic gap formed in the annular magnetic core has a relatively large size and, correspondingly, the leakage magnetic field spreads widely. Thus, when the current flowing through the coil is weak, a magnetic component to be applied to the magnetic sensing element decreases, making it difficult to measure the amount of current for generating the magnetic field to be measured with high sensitivity.

It is therefore an object of the present invention to provide a magnetic sensor capable of detecting with a high sensitivity a weak magnetic field to be measured.

Means for Solving the Problem

A magnetic sensor according to the present invention includes: a sensor chip having first and second magnetic layers magnetically coupled to each other through a magnetic gap and a magnetic sensing element disposed on a magnetic path formed by the magnetic gap; a first external magnetic member magnetically coupled to the first magnetic layer; and a first measuring current coil wound around the first external magnetic member and through which a current for generating a magnetic field to be measured flows.

According to the present invention, the magnetic sensing element and first and second magnetic layers are integrated in the sensor chip, so that the magnetic gap can be designed to be very small in width, and a leakage magnetic field can be applied in large amounts to the magnetic sensing element. Thus, even when the current flowing in the first measuring current coil to generate a magnetic field to be measured is weak, the magnetic field to be measured can be detected with high sensitivity.

The magnetic sensor according to the present invention may further have a second external magnetic member magnetically coupled to the second magnetic layer. With this configuration, a magnetic field to be detected passes through the first and second external magnetic members through the first and second magnetic layers, whereby the magnetic field can be detected with higher sensitivity. In this case, the magnetic sensor according to the present invention may further include a second measuring current coil wound around the second external magnetic member and connected in series to the first measuring current coil. With this configuration, even more magnetic fields can be applied to the magnetic sensing element.

In the present invention, the first external magnetic member may have a first part magnetically coupled to the first magnetic layer, a second part magnetically coupled to the second magnetic layer, and a third part connecting the first and second parts, and the first measuring current coil may be wound around the third part. With this configuration, the first and second magnetic layers are connected in a loop through the first external magnetic member, thereby achieving a structure almost equivalent to a closed magnetic loop.

In the present invention, the first and second magnetic layers may have a planar shape whose width becomes smaller toward the magnetic gap. With this configuration, a magnetic field is concentrated more to the magnetic sensing element, so that even more magnetic fields can be applied to the magnetic sensing element.

In the present invention, the first external magnetic member may be disposed at a position overlapping the first magnetic layer. With this configuration, a magnetic field passing through the first external magnetic member can be applied efficiently to the first magnetic layer.

In the present invention, the first measuring current coil may be wound around the first external magnetic member at a position offset to the sensor chip side. With this configuration, a magnetic field passing through the first external magnetic member can be applied efficiently to the first magnetic layer.

The magnetic sensor according to the present invention may further include a compensating coil that cancels a magnetic field generated by the first measuring current coil. This allows achievement of so-called closed loop control. In this case, the compensating coil may be wound around the first external magnetic member, whereby a sufficient number of turns of the compensating coil can be ensured. Further, in this case, the first measuring current coil may be wound at a position closer to the sensor chip than the compensating coil. With this configuration, a magnetic field generated by the first measuring current coil can be applied efficiently to the magnetic sensing element. The compensating coil may be integrally formed in the sensor chip.

Advantageous Effects of the Invention

As described above, according to the present invention, there can be provided a magnetic sensor capable of detecting with high sensitivity a weak magnetic field to be measured.

MODE FOR CARRYING OUT THE INVENTION

Hereinafter, preferred embodiments of the present invention will be described in detail with reference to the accompanying drawings.

First Embodiment

Figure 1A:
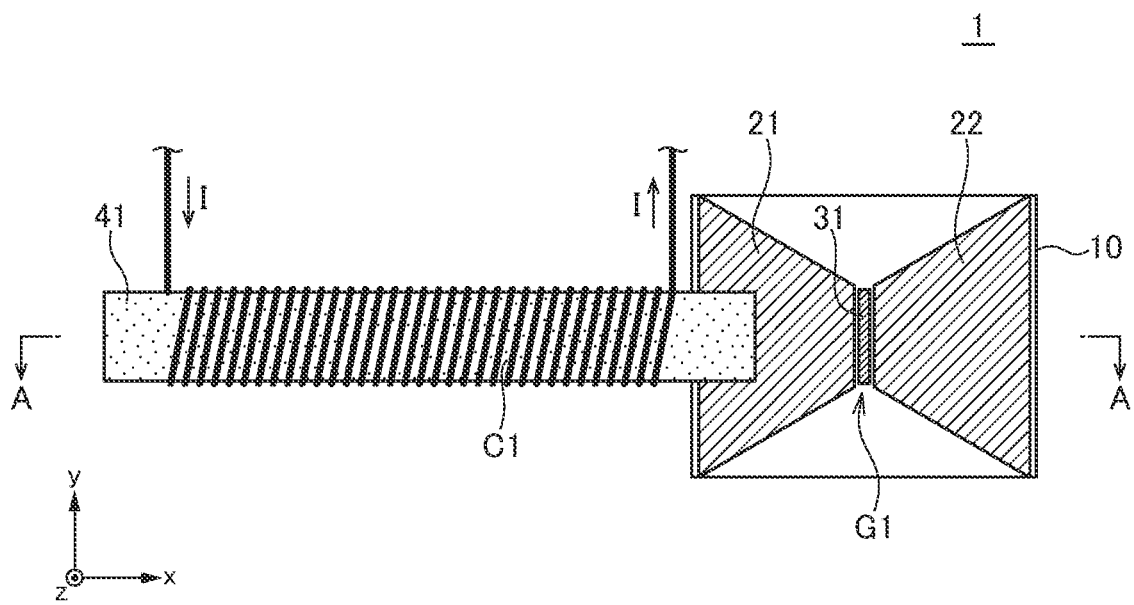
FIG. 1A is a schematic plan view illustrating the configuration of a magnetic sensor 1 according to a first embodiment of the present invention.
Figure 1B:
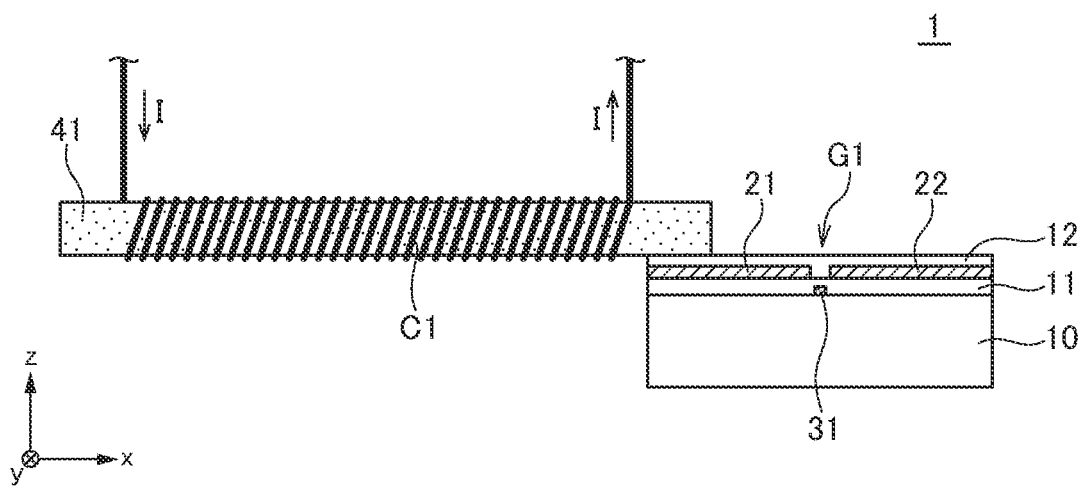
FIG. 1B is a schematic cross-sectional view taken along the line A-A in FIG. 1A.

FIG. 1A is a schematic plan view illustrating the configuration of a magnetic sensor 1 according to a first embodiment of the present invention. FIG. 1B is a schematic cross-sectional view taken along the line A-A in FIG. 1A.

As illustrated in FIG. 1, the magnetic sensor 1 according to the first embodiment includes a sensor chip 10, an external magnetic member 41 disposed so as to overlap the sensor chip 10, and a measuring current coil C1 wound around the external magnetic member 41. The sensor chip 10 has a magnetic sensing element 31 formed on the xy surface as an element forming surface, a protective film 11 covering the magnetic sensing element 31, magnetic layers 21 and 22 provided on the protective film 11, and a protective film 12 covering the magnetic layers 21 and 22.

The magnetic sensing element 31 is not particularly limited in type as long as it is an element whose electric resistance varies depending on the direction of magnetic flux and may be an MR element, for example. The fixed magnetization direction of the magnetic sensing element 31 is the x-direction. The magnetic layers 21 and 22 are each a thin film made of a high permeability material such as permalloy. The magnetic layers 21 and 22 are magnetically coupled to each other through a magnetic gap G1 having a width in the x-direction. The magnetic sensing element 31 is disposed on a magnetic path formed by the magnetic gap G1, whereby an x-direction magnetic field passing through the magnetic layers 21 and 22 is applied to the magnetic sensing element 31. In the present invention, the magnetic sensing element 31 need not necessarily be positioned within an area between the magnetic layers 21 and 22 and may be disposed in the vicinity of the magnetic gap G1 formed by the magnetic layers 21 and 22, i.e., on a magnetic path formed by the magnetic gap G1. For example, the magnetic sensing element 31 may have a width larger in the x-direction than that of the magnetic gap G1 and may thereby overlap the magnetic layers 21 and 22 in the z-direction.

The external magnetic member 41 has a bar body made of a high permeability material such as ferrite and elongated in the x-direction. The external magnetic member 41 is wound at its center section with the measuring current coil C1 through which a current I to be measured flows. One end of the external magnetic member 41 in the x-direction overlaps the magnetic layer 21 in the z-direction, whereby the external magnetic member 41 and magnetic layer 21 are magnetically coupled to each other. The measuring current coil C1 has a coil axis extending in the x-direction, whereby when the current I to be measured flows through the measuring current coil C1, an x-direction magnetic field to be measured is generated in the external magnetic member 41. The x-direction magnetic field to be measured generated in the external magnetic member 41 is applied to the magnetic layer 21 and then flows to the magnetic layer 22 through the magnetic gap G1. This allows the magnetic sensing element 31 disposed in the magnetic gap G1 to detect the direction and strength of the magnetic field to be detected generated by the measuring current coil C1, and thus, the amount of current I to be measured can be detected. That is, the magnetic sensor 1 according to the present embodiment functions as a current sensor that detects the amount of current I to be measured.

As described above, unlike a configuration in which the magnetic sensing element is not disposed in the magnetic gap formed in the annular magnetic core, the magnetic sensor 1 according to the present embodiment employs a configuration in which the external magnetic member 41 wound with the measuring current coil C1 and the magnetic layer 21 are magnetically coupled to each other, and the magnetic sensing element 31 is disposed in the magnetic gap G1 between the magnetic layers 21 and 22. Since the magnetic sensing element 31 and the magnetic layers 21 and 22 are integrated on the sensor chip 10, the magnetic gap G1 can be designed to be very small in width, and the positional relation between the magnetic gap G1 and the magnetic sensing element 31 can be designed with high accuracy. Thus, even when the current I to be measured is weak, the magnetic field to be measured generated by the measuring current coil C1 can be detected with high sensitivity.

Second Embodiment

Figure 2:
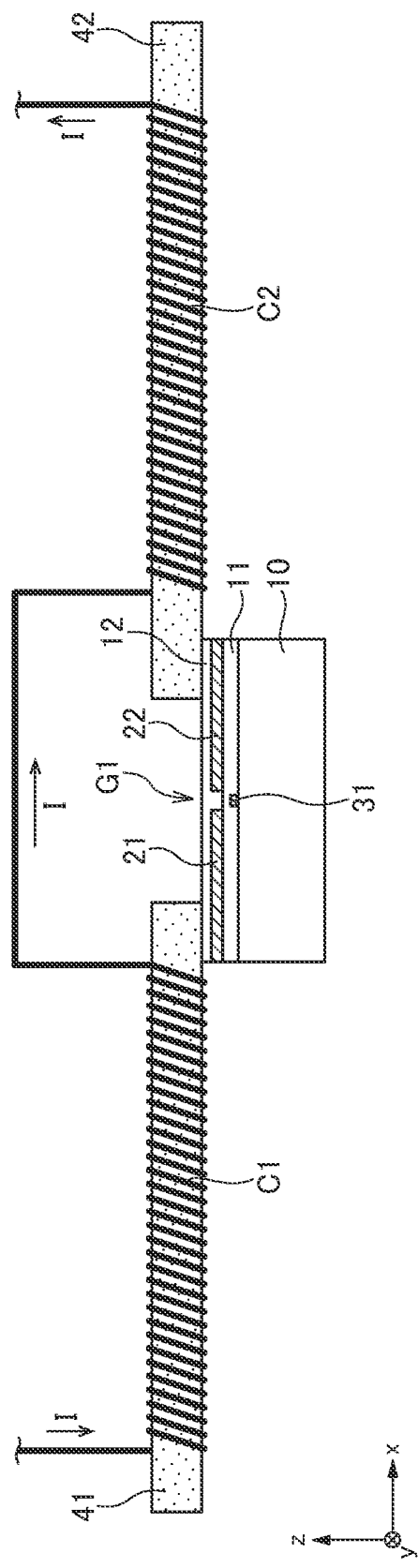
FIG. 2 is a schematic cross-sectional view illustrating the configuration of a magnetic sensor 2 according to a second embodiment of the present invention.

FIG. 2 is a schematic cross-sectional view illustrating the configuration of a magnetic sensor 2 according to a second embodiment of the present invention.

As illustrated in FIG. 2, the magnetic sensor 2 according to the second embodiment differs from the magnetic sensor 1 according to the first embodiment in that it additionally includes an external magnetic member 42 and a measuring current coil C2. Other basic configurations are the same as those of the magnetic sensor 1 according to the first embodiment, so the same reference numerals are given to the same elements, and overlapping description will be omitted.

The external magnetic member 42 has a bar body made of the same high permeability material as the external magnetic member 41 and elongated in the x-direction. The external magnetic member 42 is wound at its center section with the measuring current coil C2. The measuring current coil C2 is connected in series to the measuring current coil C1. Thus, the current I to be measured flows also through the measuring current coil C2. One end of the external magnetic member 42 in the x-direction overlaps the magnetic layer 22 in the z-direction, whereby the external magnetic member 42 and magnetic layer 22 are magnetically coupled to each other. The measuring current coils C1 and C2 each have a coil axis extending in the x-direction, whereby when the current I to be measured flows through the measuring current coils C1 and C2, an x-direction magnetic field to be measured is generated in the external magnetic members 41 and 42.

As described above, the magnetic sensor 2 according to the present embodiment includes the external magnetic member 42 magnetically coupled to the magnetic layer 22 and wound with the measuring current coil C2, thereby making it possible to detect the magnetic field to be measured generated by the current I to be measured with higher sensitivity.

Third Embodiment

Figure 3:
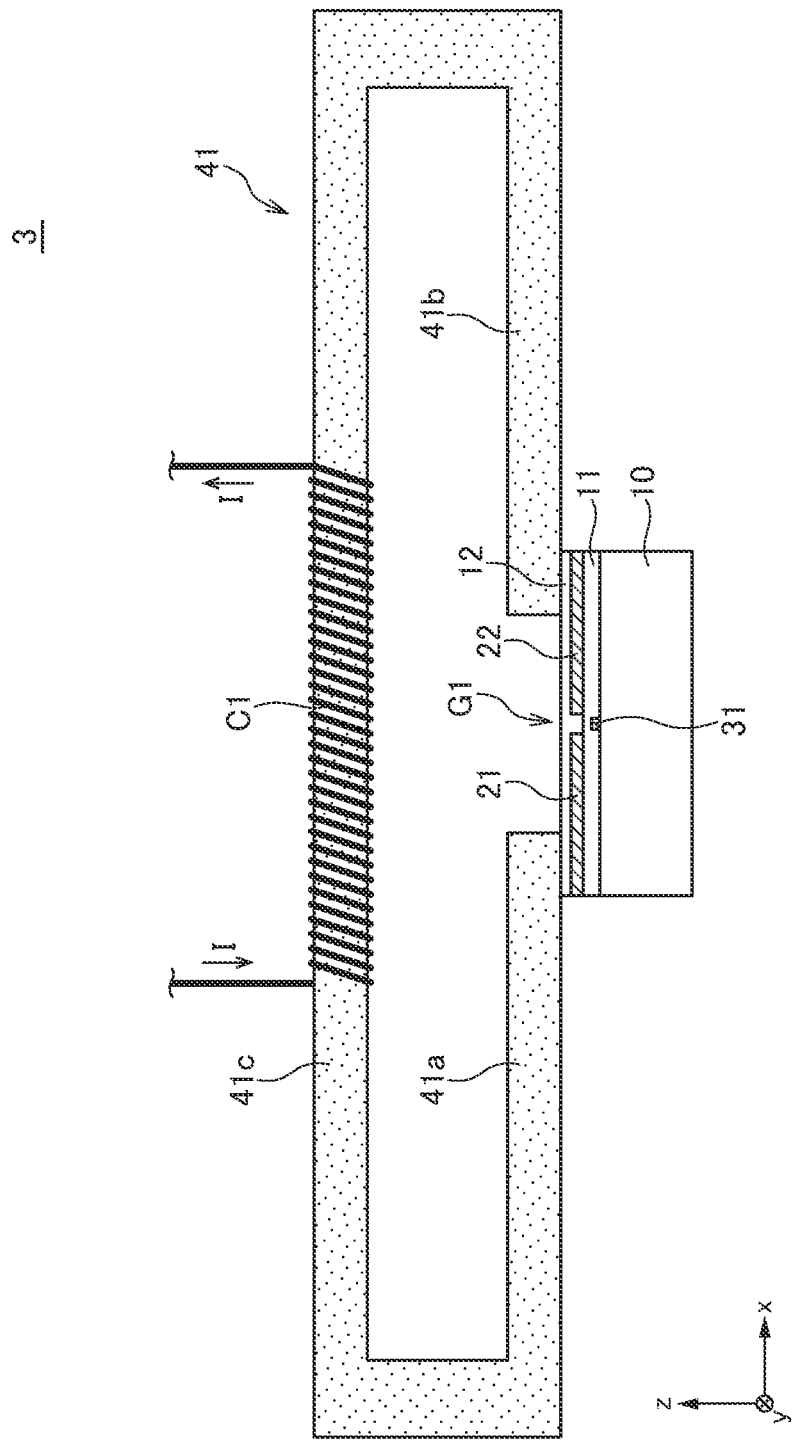
FIG. 3 is a schematic cross-sectional view illustrating the configuration of a magnetic sensor 3 according to a third embodiment of the present invention.

FIG. 3 is a schematic cross-sectional view illustrating the configuration of a magnetic sensor 3 according to a third embodiment of the present invention.

As illustrated in FIG. 3, the magnetic sensor 3 according to the third embodiment differs from the magnetic sensor 1 according to the first embodiment in the shape of the external magnetic member 41. Other basic configurations are the same as those of the magnetic sensor 1 according to the first embodiment, so the same reference numerals are given to the same elements, and overlapping description will be omitted.

In the present embodiment, the external magnetic member 41 has first to third parts 41a to 41c. The first part 41a overlaps the magnetic layer 21 to be magnetically coupled thereto, and the first part 41b overlaps the magnetic layer 22 to be magnetically coupled thereto. The third part 41c connects the first and second parts 41a and 41b and wound with the measuring current coil C1. The external magnetic member 41 may integrally include the first to third parts 41a to 41c or may be obtained by bonding or coupling the separately formed first to third parts 41a to 41c.

With the above configuration, a loop-shaped magnetic path almost equivalent to a closed magnetic path is formed by the external magnetic member 41 and magnetic layers 21 and 22, so that even when the current I to be measured is weak, the magnetic field to be measured generated by the current I to be measured can be applied efficiently to the magnetic sensing element 31.

Fourth Embodiment

Figure 4:
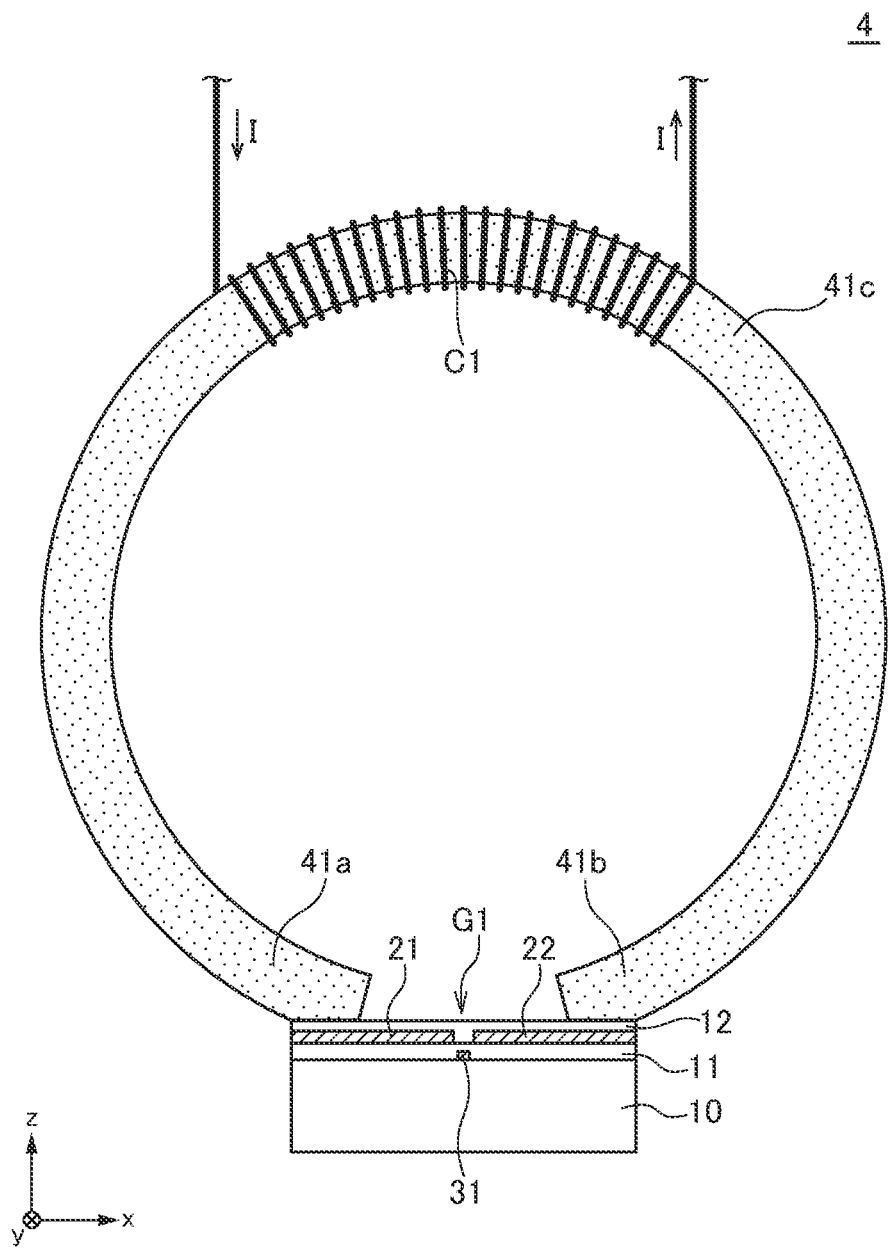
FIG. 4 is a schematic cross-sectional view illustrating the configuration of a magnetic sensor 4 according to a fourth embodiment of the present invention.

FIG. 4 is a schematic cross-sectional view illustrating the configuration of a magnetic sensor 4 according to a fourth embodiment of the present invention.

As illustrated in FIG. 4, the magnetic sensor 4 according to the fourth embodiment differs from the magnetic sensor 3 according to the third embodiment in that the external magnetic member 41 has a substantially ring shape. Other basic configurations are the same as those of the magnetic sensor 3 according to the third embodiment, so the same reference numerals are given to the same elements, and overlapping description will be omitted.

According to the present embodiment, the magnetic field flows more smoothly in the external magnetic member 41, so that the magnetic field to be measured generated by the current I to be measured can be applied more efficiently to the magnetic sensing element 31.

Fifth Embodiment

Figure 5:
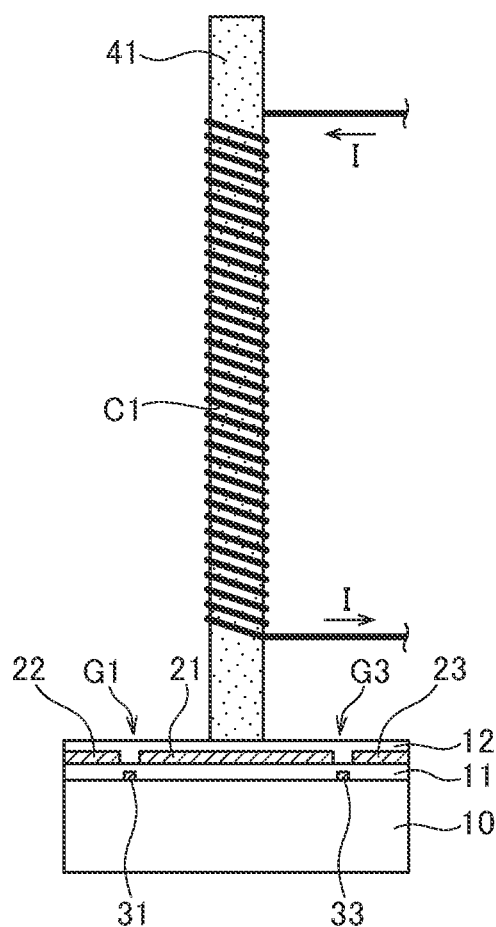
FIG. 5 is a schematic cross-sectional view illustrating the configuration of a magnetic sensor 5 according to a fifth embodiment of the present invention.
Figure 6:
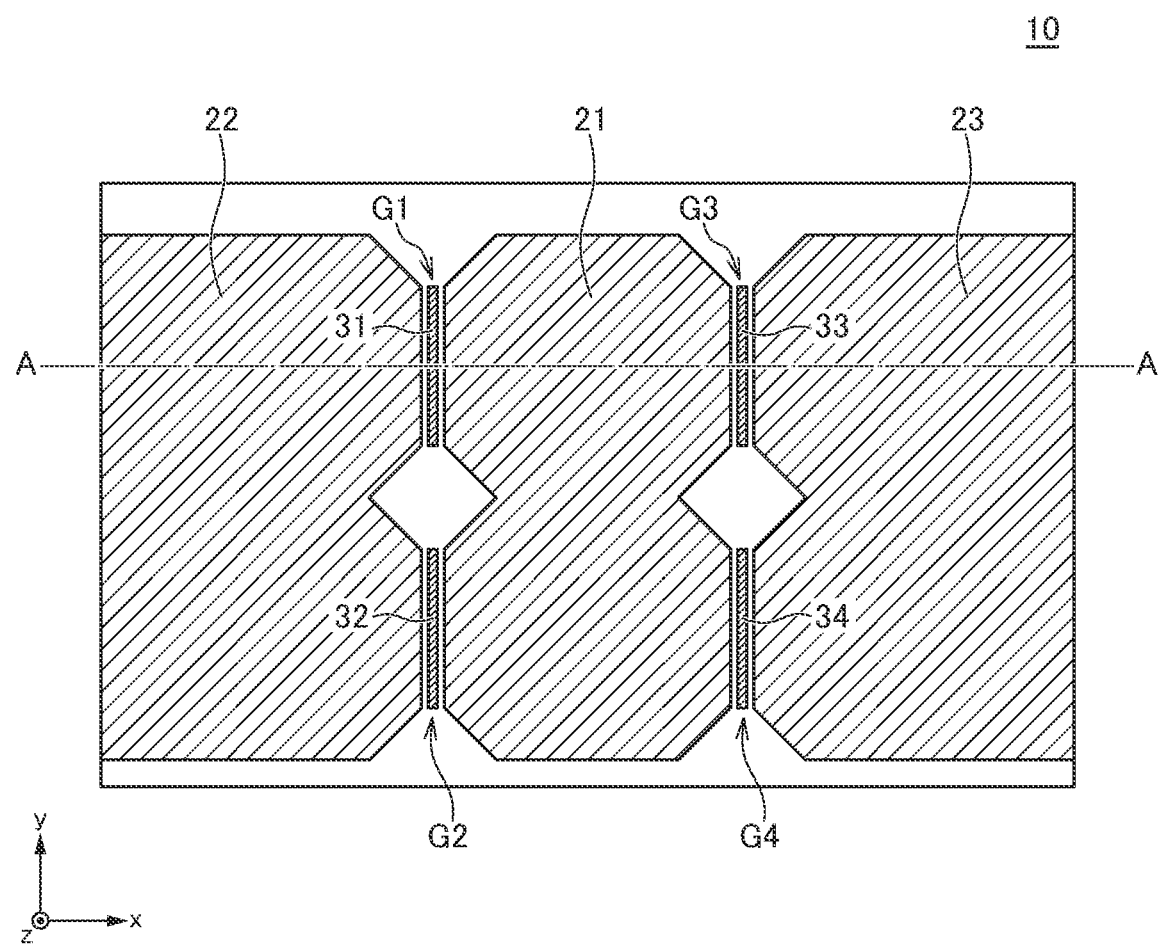
FIG. 6 is a schematic plan view for explaining the configuration of the sensor chip 10 used in the fifth embodiment.

FIG. 5 is a schematic cross-sectional view illustrating the configuration of a magnetic sensor 5 according to a fifth embodiment of the present invention. FIG. 6 is a schematic plan view for explaining the configuration of the sensor chip 10 used in the fifth embodiment. The cross section illustrated in FIG. 5 corresponds to the cross section taken along the line A-A in FIG. 6.

As illustrated in FIGS. 5 and 6, the magnetic sensor 5 according to the fifth embodiment differs from the magnetic sensor 1 according to the first embodiment in the structure of the sensor chip 10 and the longitudinal direction of the external magnetic member 41. Other basic configurations are the same as those of the magnetic sensor 1 according to the first embodiment, so the same reference numerals are given to the same elements, and overlapping description will be omitted.

The sensor chip 10 used in the fifth embodiment has four magnetic sensing elements 31 to 34 and three magnetic layers 21 to 23. The magnetic sensing elements 31 to 34 have the same fixed magnetization direction (e.g., positive side of the x-direction). The magnetic layer 21 is disposed so as to be sandwiched between the magnetic layers 22 and 23. Two magnetic gaps G1 and G2 are formed between the magnetic layers 21 and 22, and two magnetic gaps G3 and G4 are formed between the magnetic layers 21 and 23. The magnetic sensing elements 31 to 34 are disposed respectively to magnetic paths formed by the magnetic gaps G1 to G4.

Further, in the present embodiment, the external magnetic member 41 is elongated in the z-direction, and one end thereof overlaps the magnetic layer 21. The coil axis of the measuring current coil C1 wound around the external magnetic member 41 extends in the z-direction. Thus, when the current I to be measured flows through the measuring current coil C1, a z-direction magnetic field to be measured is generated in the external magnetic member 41. The z-direction magnetic field to be measured generated in the external magnetic member 41 is applied to the magnetic layer 21, half of which flows to the magnetic layer 22 through the magnetic gaps G1 and G2, and the remaining half of which flows to the magnetic layer 23 through the magnetic gaps G3 and G4. The magnetic fields passing through the magnetic gaps G1 to G4 are applied respectively to the magnetic sensing elements 31 to 34.

Then, the magnetic sensing elements 31 to 34 are full-bridge connected, whereby it is possible to detect the magnetic field generated by the current I to be measured with higher sensitivity as compared to when only one magnetic sensing element 31 is provided. In addition, in the present embodiment, the magnetic layers 21 to 23 have a planar shape whose width becomes smaller toward the magnetic gaps G1 to G4, so that the magnetic field is concentrated more to the magnetic sensing elements 31 to 34. This allows even more magnetic fields to be applied to the magnetic sensing elements 31 to 34. As an alternative, two magnetic sensing elements (e.g., magnetic sensing elements 31 and 33) may be used and half-bridge connected.

Sixth Embodiment

Figure 7:
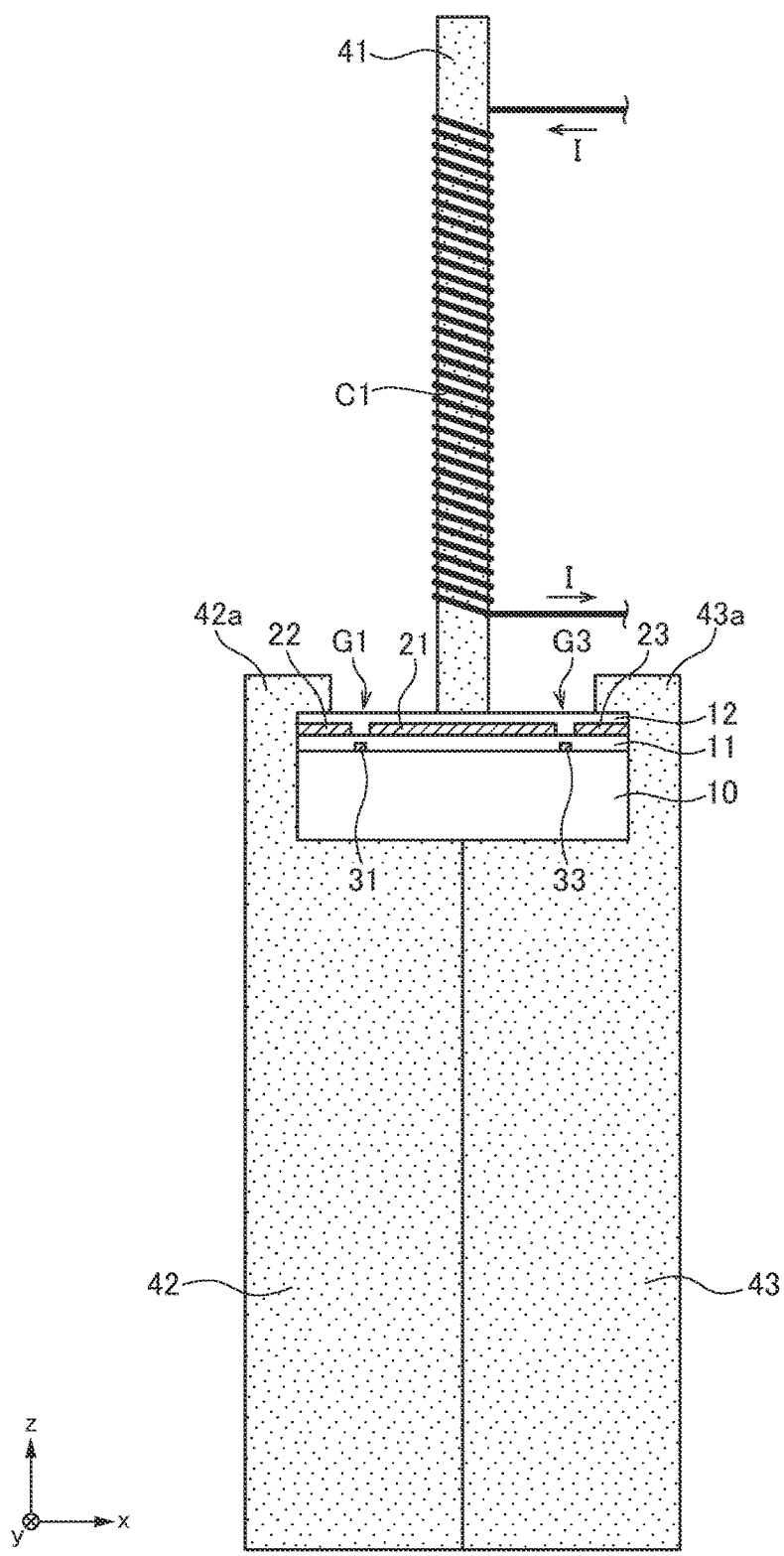
FIG. 7 is a schematic cross-sectional view illustrating the configuration of a magnetic sensor 6 according to a sixth embodiment of the present invention.

FIG. 7 is a schematic cross-sectional view illustrating the configuration of a magnetic sensor 6 according to a sixth embodiment of the present invention.

As illustrated in FIG. 7, the magnetic sensor 6 according to the sixth embodiment differs from the magnetic sensor 5 according to the fifth embodiment in that it additionally includes external magnetic members 42 and 43. Other basic configurations are the same as those of the magnetic sensor 5 according to the fifth embodiment, so the same reference numerals are given to the same elements, and overlapping description will be omitted.

The external magnetic members 42 and 43 cover the back and side surfaces of the sensor chip 10 and respectively have protruded parts 42a and 43a which overlap the magnetic layers 22 and 23, respectively, to be magnetically coupled thereto. With this configuration, the magnetic field flowing from the external magnetic member 41 to the magnetic layers 22 and 23 through the magnetic layer 21 is applied efficiently to the external magnetic members 42 and 43, thereby reducing a leakage magnetic field, which allows more magnetic fields to be applied to the magnetic sensing elements 31 to 34.

Seventh Embodiment

Figure 8:
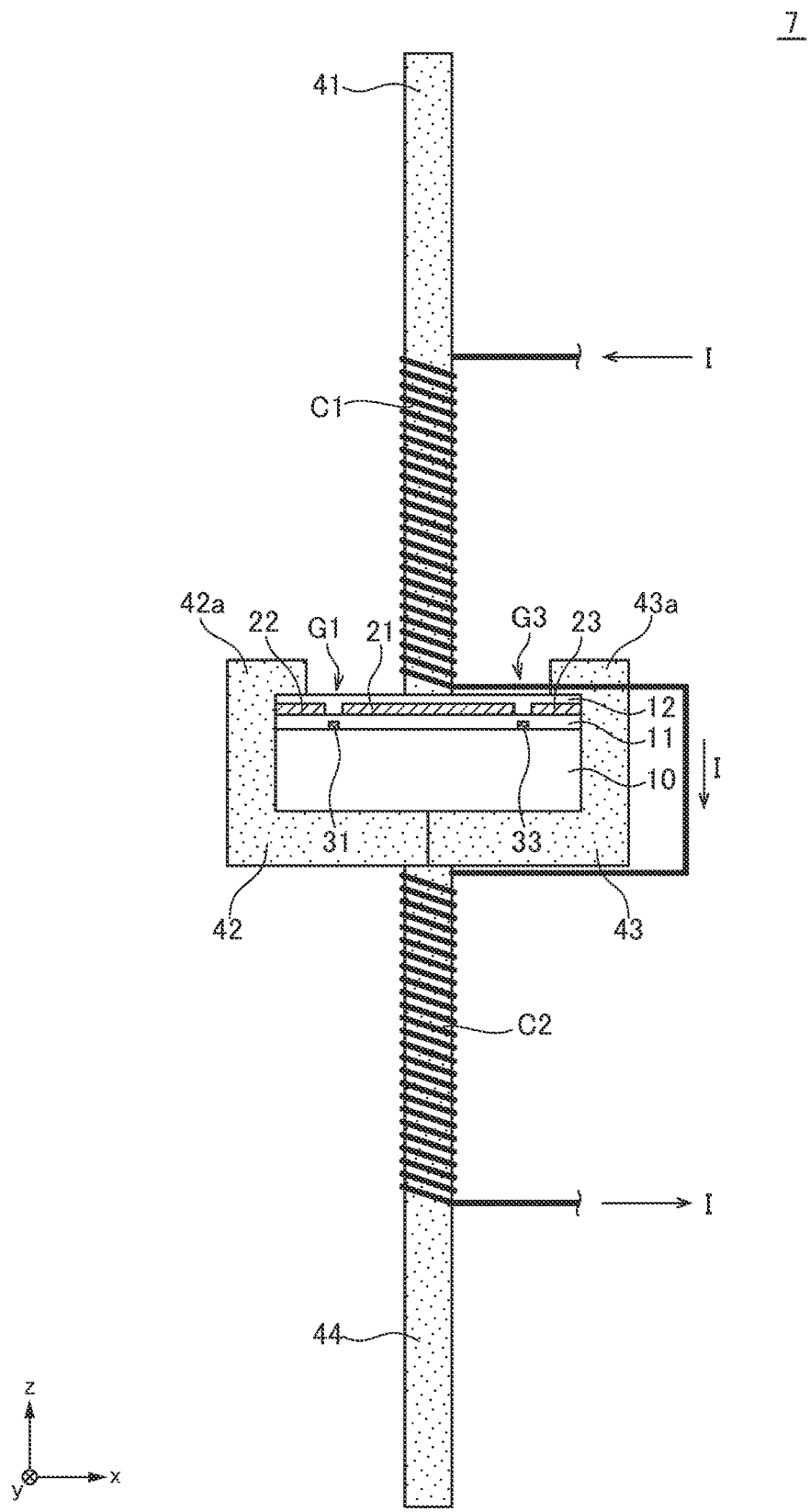
FIG. 8 is a schematic cross-sectional view illustrating the configuration of a magnetic sensor 7 according to a seventh embodiment of the present invention.

FIG. 8 is a schematic cross-sectional view illustrating the configuration of a magnetic sensor 7 according to a seventh embodiment of the present invention.

As illustrated in FIG. 8, the magnetic sensor 7 according to the seventh embodiment differs from the magnetic sensor 6 according to the sixth embodiment in that it includes an external magnetic member 44 in place of the external magnetic members 42 and 43 and that a measuring current coil C2 is wound around the external magnetic member 44. Other basic configurations are the same as those of the magnetic sensor 6 according to the sixth embodiment, so the same reference numerals are given to the same elements, and overlapping description will be omitted.

The external magnetic member 44 covers the back and side surfaces of the sensor chip 10 and has protruding parts 42a and 43a which overlap the magnetic layers 22 and 23, respectively, to be magnetically coupled thereto. The external magnetic member 44 has a bar-like part extending in the z-direction and having substantially the same thickness as the external magnetic member 41, and the measuring current coil C2 is wound around the bar-like part. The measuring current coil C2 is connected in series to the measuring current coil C1, and thus the current I to be measured flows therethrough.

As described above, in the magnetic sensor 7 according to the present embodiment, the measuring current coils C1 and C2 are wound respectively around the external magnetic members 41 and 44, so that the magnetic field to be measured generated by the current I to be measured can be detected with higher sensitivity. In addition, in the present embodiment, both the measuring current coils C1 and C2 are wound at a position offset to the sensor chip 10 side. More specifically, the measuring current coils C1 and C2 are positioned not at the center portions of the respective external magnetic members 41 and 44 in the axial direction, but at positions offset in the negative z-direction (measuring current coil C1) and positive z-direction (measuring current coil C2) so as to approach the sensor chip 10. This reduces a leakage magnetic field not applied to the magnetic sensing elements 31 to 34, allowing the magnetic field passing through the external magnetic members 41 and 44 to be applied efficiently to the magnetic sensing elements 31 to 34.

Eighth Embodiment

Figure 9:
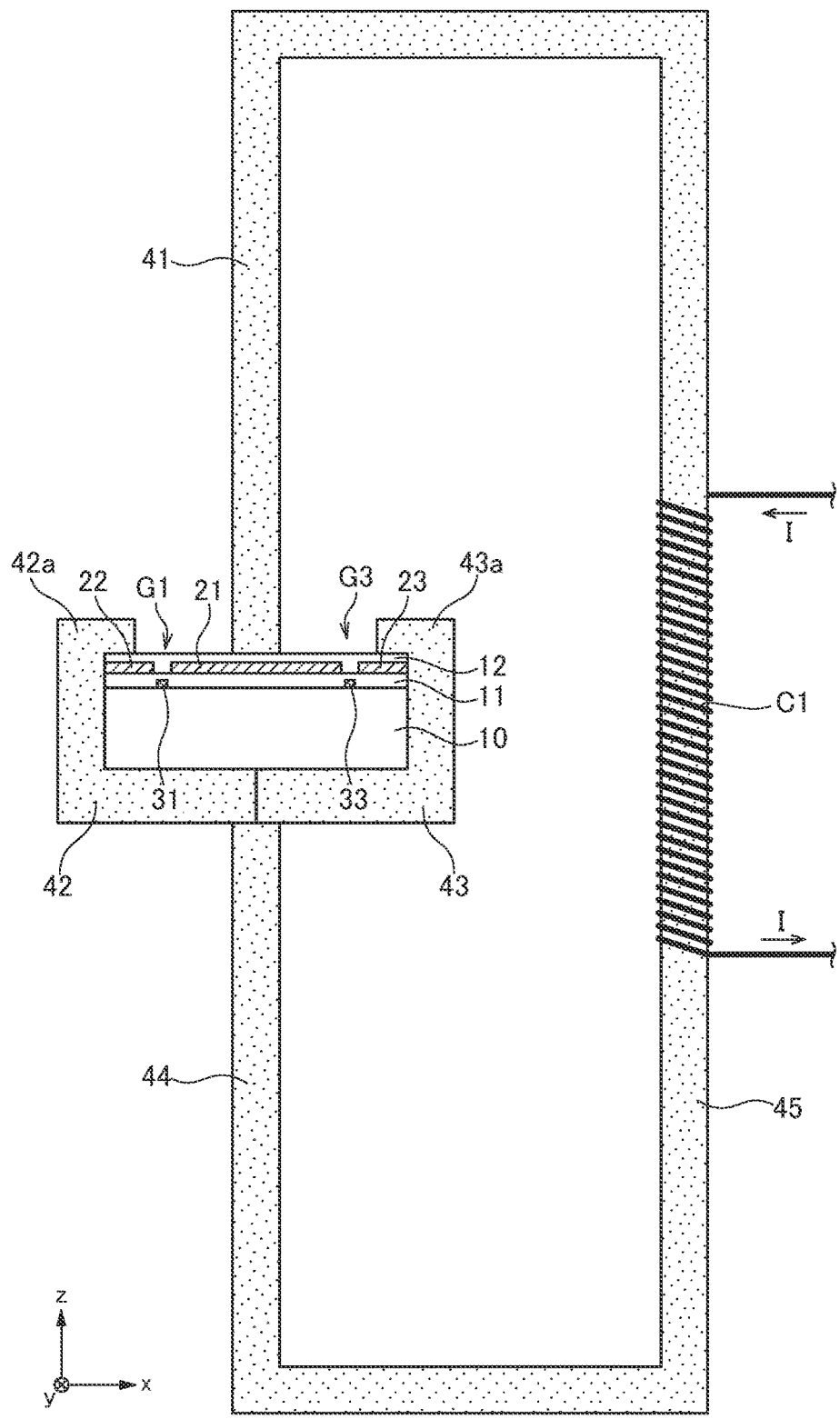
FIG. 9 is a schematic cross-sectional view illustrating the configuration of a magnetic sensor 8 according to an eighth embodiment of the present invention.

FIG. 9 is a schematic cross-sectional view illustrating the configuration of a magnetic sensor 8 according to an eighth embodiment of the present invention.

As illustrated in FIG. 9, the magnetic sensor 8 according to the eighth embodiment differs from the magnetic sensor 7 according to the seventh embodiment in that it additionally includes an external magnetic member connecting the external magnetic members 41 and 44 and that the measuring current coil C1 is wound around the external magnetic member 45. Other basic configurations are the same as those of the magnetic sensor 7 according to the seventh embodiment, so the same reference numerals are given to the same elements, and overlapping description will be omitted.

Figure 10:
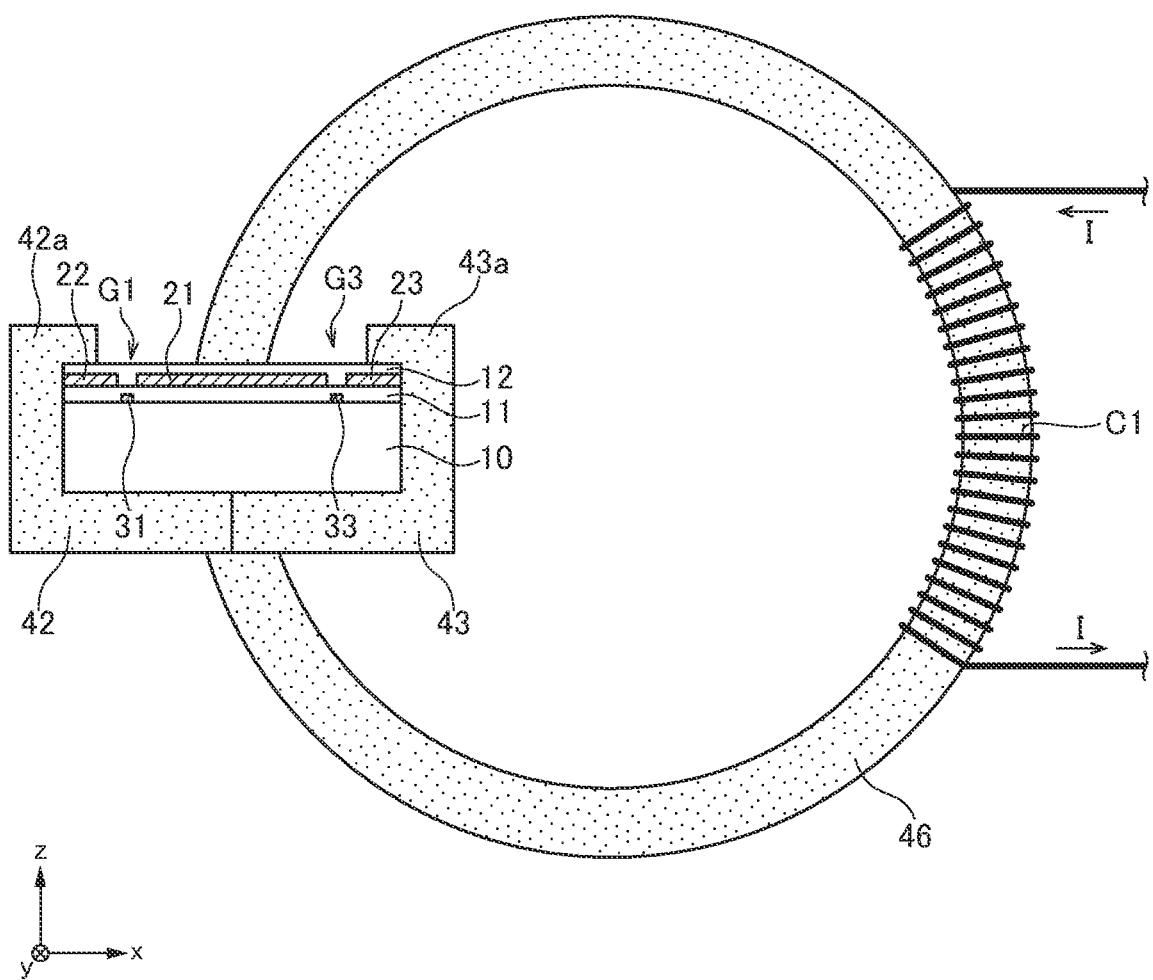
FIG. 10 is a schematic cross-sectional view illustrating the configuration of a magnetic sensor 8a according to a modification of the eighth embodiment.

In the present embodiment, a loop-shaped magnetic path almost equivalent to a closed magnetic path is formed by the external magnetic members 41, 44 and magnetic layers 21 to 23, so that the magnetic field to be measured generated by the current I to be measured can be applied efficiently to the magnetic sensing elements 31 to 34. The external magnetic members 41, 44, and 45 may be separate members or may be formed integrally as a single member. Further, the external magnetic members 41, 44, and 45 need not necessarily have a linear configuration, but a ring-shaped external magnetic member 46 may be used to constitute a magnetic sensor 8a as illustrated in a modification in FIG. 10.

Ninth Embodiment

Figure 11:
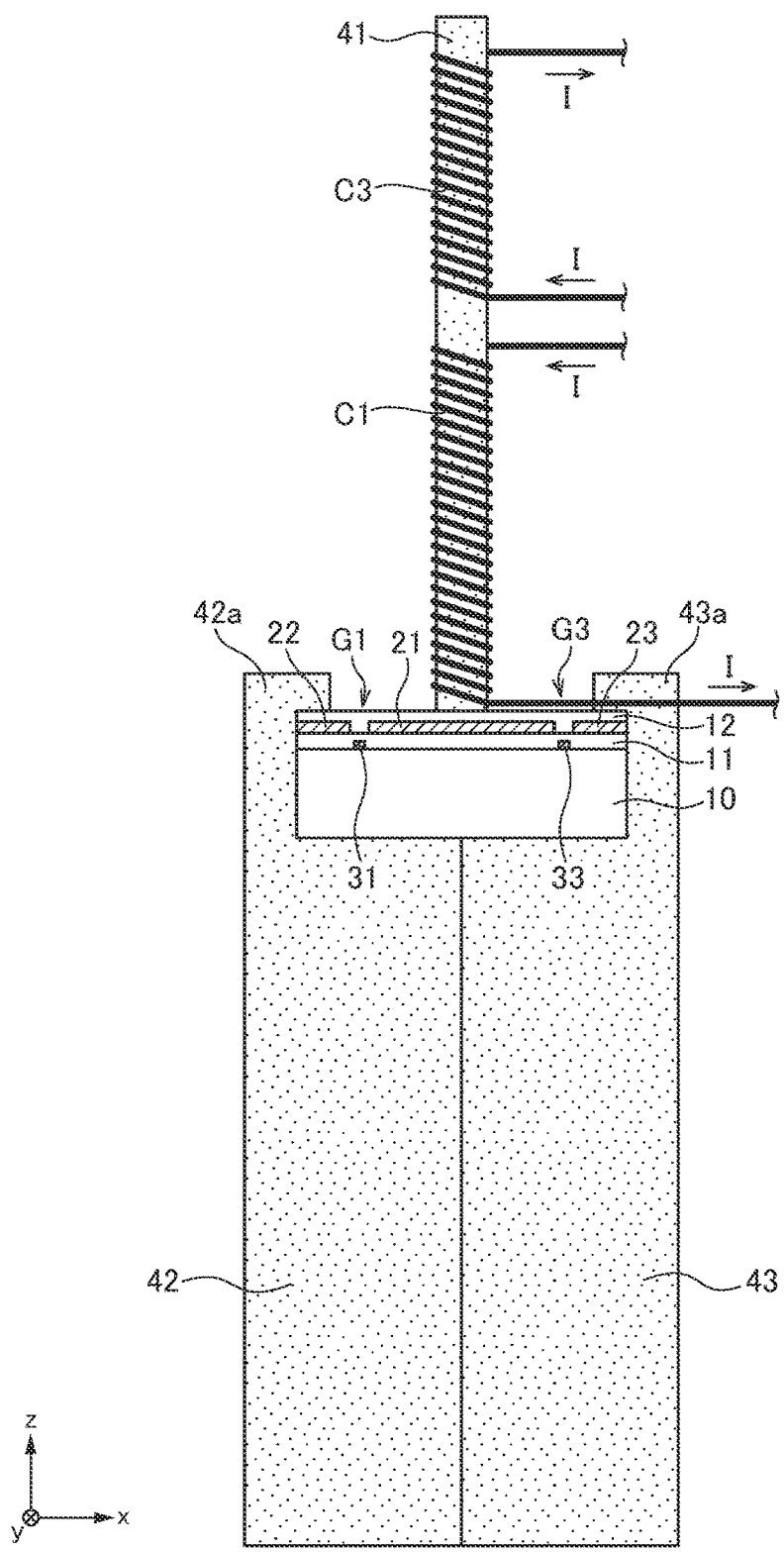
FIG. 11 is a schematic cross-sectional view illustrating the configuration of a magnetic sensor 9 according to a ninth embodiment of the present invention.

FIG. 11 is a schematic cross-sectional view illustrating the configuration of a magnetic sensor 9 according to a ninth embodiment of the present invention.

As illustrated in FIG. 11, the magnetic sensor 9 according to the ninth embodiment differs from the magnetic sensor 6 according to the sixth embodiment in that a compensating coil C3 is wound around the external magnetic member 41. Other basic configurations are the same as those of the magnetic sensor 6 according to the sixth embodiment, so the same reference numerals are given to the same elements, and overlapping description will be omitted.

The compensating coil C3 cancels the magnetic field generated by the measuring current coil C1, and a current flows in the opposite directions in the compensating coil C3 and measuring current coil C1. Using the compensating coil C3 allows achievement of so-called closed loop control. The compensating coil C3 may be integrated in the sensor chip 10; however, when it is wound around the external magnetic member 41, a sufficient number of turns of the compensating coil C3 can be ensured.

The winding positions of the measuring current coil C1 and compensating coil C3 are not particularly limited; however, as in the example of FIG. 11, when the winding position of the measuring current coil C1 is closer to the sensor chip 10 than the winding position of the compensating coil C3, the magnetic field generated by the measuring current coil C1 can be applied efficiently to the magnetic sensing elements 31 to 34. Further, a part of or the entire compensating coil may be integrated in the sensor chip 10.

While the preferred embodiment of the present invention has been described, the present invention is not limited to the above embodiment, and various modifications may be made within the scope of the present invention, and all such modifications are included in the present invention.

REFERENCE SIGNS LIST 1-9 magnetic sensor
10 sensor chip
11, 12 protective film
21-23 magnetic layer
31-34 magnetic sensing element
41-46 external magnetic member
41a first part
41b second part
41c third part
42a, 43a protruded part
C1, C2 measuring current coil
C3 compensating coil
G1-G4 magnetic gap
I current to be measured

What is claimed is:

1. A magnetic sensor comprising:
a sensor chip having first and second magnetic layers magnetically coupled to each other through a magnetic gap and a magnetic sensing element disposed on a magnetic path formed by the magnetic gap;
a first external magnetic member magnetically coupled to the first magnetic layer;
a second external magnetic member magnetically coupled to the second magnetic layer; and
a first measuring current coil wound around the first external magnetic member and through which a current for generating a magnetic field to be measured flows.

2. The magnetic sensor as claimed in claim 1, further comprising a second measuring current coil wound around the second external magnetic member and connected in series to the first measuring current coil.

3. The magnetic sensor as claimed in claim 1,
wherein the first external magnetic member has a first part magnetically coupled to the first magnetic layer, a second part magnetically coupled to the second magnetic layer, and a third part connecting the first and second parts, and
wherein the first measuring current coil is wound around the third part.

4. The magnetic sensor as claimed in claim 1, wherein the first and second magnetic layers have a planar shape whose width becomes smaller toward the magnetic gap.

5. The magnetic sensor as claimed in claim 1, wherein the first external magnetic member is disposed at a position overlapping the first magnetic layer.

6. The magnetic sensor as claimed in claim 1, wherein the first measuring current coil is wound around the first external magnetic member at a position offset to the sensor chip side.

7. The magnetic sensor as claimed in claim 1, further comprising a compensating coil that cancels a magnetic field generated by the first measuring current coil.

8. The magnetic sensor as claimed in claim 7, wherein the compensating coil is wound around the first external magnetic member.

9. The magnetic sensor as claimed in claim 8, wherein the first measuring current coil is wound at a position closer to the sensor chip than the compensating coil.

10. A magnetic sensor comprising:
a sensor chip having first and second magnetic layers magnetically coupled to each other through a magnetic gap and a magnetic sensing element disposed on a magnetic path formed by the magnetic gap;
a first external magnetic member magnetically coupled to the first magnetic layer; and
a measuring current coil wound around the first external magnetic member and through which a current for generating a magnetic field to be measured flows,
wherein the first and second magnetic layers have a planar shape whose width becomes smaller toward the magnetic gap.

11. The magnetic sensor as claimed in claim 10,
wherein the first external magnetic member has a first part magnetically coupled to the first magnetic layer, a second part magnetically coupled to the second magnetic layer, and a third part connecting the first and second parts, and
wherein the measuring current coil is wound around the third part.

12. The magnetic sensor as claimed in claim 10, wherein the first external magnetic member is disposed at a position overlapping the first magnetic layer.

13. The magnetic sensor as claimed in claim 10, wherein the measuring current coil is wound around the first external magnetic member at a position offset to the sensor chip side.

14. The magnetic sensor as claimed in claim 10, further comprising a compensating coil that cancels a magnetic field generated by the measuring current coil.

15. The magnetic sensor as claimed in claim 14, wherein the compensating coil is wound around the first external magnetic member.

16. The magnetic sensor as claimed in claim 15, wherein the measuring current coil is wound at a position closer to the sensor chip than the compensating coil.

17. A magnetic sensor comprising:
a sensor chip having:
an element forming surface extending in a first direction and a second direction perpendicular to the first direction;
first and second magnetic layers disposed on the element forming surface and magnetically coupled to each other through a magnetic gap extending in the second direction; and
a magnetic sensing element disposed on a magnetic path formed by the magnetic gap on the element forming surface;
an external magnetic member having a rod shape extending linearly in a third direction perpendicular to the first and second directions;
a measuring current coil wound around the external magnetic member and through which a current for generating a magnetic field to be measured flows; and
a compensating coil wound around the external magnetic member and canceling the magnetic field generated by the measuring current coil,
wherein the external magnetic member is disposed such that one end of the external magnetic member in the third direction overlaps the first magnetic layer, and
wherein the measuring current coil and the compensation coil are arranged coaxially such that a winding position of the measuring current coil in the third direction and a winding position of the compensation coil in the third direction are different from each other.

18. The magnetic sensor as claimed in claim 17, wherein the first and second magnetic layers have a planar shape whose width in the second direction becomes smaller toward the magnetic gap.

19. The magnetic sensor as claimed in claim 17, wherein the measuring current coil is wound around the external magnetic member at a position offset to the sensor chip side.

20. The magnetic sensor as claimed in claim 17, wherein the measuring current coil is wound at a position closer to the sensor chip than the compensating coil.

* * * * *